(12) United States Patent
Arndt et al.

(10) Patent No.: US 9,915,822 B2
(45) Date of Patent: *Mar. 13, 2018

(54) THERMOPLASTIC FILM FOR A LAMINATED-GLASS PANE HAVING A NON-LINEAR CONTINUOUS WEDGE INSERT IN THE VERTICAL AND HORIZONTAL DIRECTION IN SOME SECTIONS

(71) Applicant: SAINT-GOBAIN GLASS FRANCE, Courbevoie (FR)

(72) Inventors: Martin Arndt, Aachen (DE); Stefan Gossen, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/038,321

(22) PCT Filed: Nov. 10, 2014

(86) PCT No.: PCT/EP2014/074115
§ 371 (c)(1),
(2) Date: May 20, 2016

(87) PCT Pub. No.: WO2015/086233
PCT Pub. Date: Jun. 18, 2015

(65) Prior Publication Data
US 2016/0291324 A1 Oct. 6, 2016

(30) Foreign Application Priority Data
Dec. 12, 2013 (EP) .................................... 13196871

(51) Int. Cl.
*G03B 21/56* (2006.01)
*G02B 27/00* (2006.01)
(Continued)

(52) U.S. Cl.
CPC .... *G02B 27/0018* (2013.01); *B32B 17/10036* (2013.01); *B32B 17/10568* (2013.01);
(Continued)

(58) Field of Classification Search
USPC ......................................... 359/443
See application file for complete search history.

(56) References Cited

U.S. PATENT DOCUMENTS 5,013,134 A * 5/1991 Smith ............... B32B 17/10568
345/7
5,130,174 A * 7/1992 Esposito ........... B32B 17/10339
428/156
(Continued)

FOREIGN PATENT DOCUMENTS

JP H03209210 A 9/1991
JP 2004536009 A 12/2004
(Continued)

OTHER PUBLICATIONS

Written Opinion for International Patent Application No. PCT/EP2014/074115 filed Nov. 10, 2014 on behalf of Saint-Gobain Glass France, dated Jan. 21, 2015. 14 pages. (English translation + German original).

(Continued)

*Primary Examiner* — Rodney Fuller
(74) *Attorney, Agent, or Firm* — Steinfl + Bruno LLP

(57) ABSTRACT

A thermoplastic film for a laminated-glass pane, having a non-linear continuous wedge insert in both a vertical and horizontal direction in some sections, is described. In the vertical direction, the laminated-glass pane is, from the perspective of an observer, further at a lower end than at an upper end. In a laminated-glass pane equipped with the thermoplastic film, the thermoplastic film is located between two glass layers. The thermoplastic film has at least a first (Continued)

section having a wedge angle profile that is continuous and non-linear in the vertical and horizontal direction, such that ghost images from a head-up display are minimized in the region of the first section. The thermoplastic film also minimizes double images in transmission in the first section and in further sections.

15 Claims, 7 Drawing Sheets

(51) Int. Cl.
  *B32B 17/10*    (2006.01)
  *G02B 27/01*    (2006.01)
  *G02B 1/04*    (2006.01)
  *G03B 21/62*    (2014.01)

(52) U.S. Cl.
  CPC ......... B32B 17/10761 (2013.01); G02B 1/04 (2013.01); G02B 27/0101 (2013.01); G03B 21/62 (2013.01); *B32B 2250/03* (2013.01); *B32B 2250/40* (2013.01); *B32B 2605/006* (2013.01); *G02B 2027/012* (2013.01)

(56) References Cited

U.S. PATENT DOCUMENTS

| | | | | |
|---|---|---|---|---|
| 5,812,332 | A * | 9/1998 | Freeman | B32B 3/02 156/102 |
| 5,945,199 | A * | 8/1999 | Morin | B32B 17/10018 345/7 |
| 8,075,983 | B2 * | 12/2011 | Masaki | B32B 17/10036 428/195.1 |
| 8,764,923 | B2 * | 7/2014 | Durbin | B29C 55/045 156/102 |
| 9,067,386 | B2 * | 6/2015 | Miyai | B32B 17/10568 |
| 2002/0086141 | A1 * | 7/2002 | Sauer | B32B 17/10 428/156 |
| 2004/0166288 | A1 * | 8/2004 | Travis | B29C 47/0021 428/156 |
| 2006/0210776 | A1 * | 9/2006 | Lu | B32B 17/10 428/192 |
| 2007/0009714 | A1 * | 1/2007 | Lee | B32B 17/10568 428/172 |
| 2007/0148472 | A1 | 6/2007 | Masaki et al. | |
| 2010/0314900 | A1 | 12/2010 | Labrot et al. | |
| 2011/0189426 | A1 | 8/2011 | Durbin et al. | |
| 2017/0003503 | A1 * | 1/2017 | Arndt | B32B 17/10036 |

FOREIGN PATENT DOCUMENTS

| | | |
|---|---|---|
| JP | 2008201667 A | 9/2008 |
| JP | 2009035444 A | 2/2009 |
| JP | 2017502124 A | 1/2017 |

OTHER PUBLICATIONS

International Search Report for International Patent Application No. PCT/EP2014/074116 filed Nov. 10, 2014 on behalf of Saint-Gobain Glass France, dated Jan. 21, 2015. 5 pages. (English translation + German original).

Written Opinion for International Patent Application No. PCT/EP2014/074116 filed Nov. 10, 2014 on behalf of Saint-Gobain Glass France, dated Jan. 21, 2015. 17 pages. (English translation + German original).

J.P. Aclocque "Double Vision as a Disturbing Optical Failure of the Windshield" Z. Glastechn. Ber., May 1970, vol. 43, Issue 5; pp. 193-198 (English translation + German original).

International Search Report for International Application No. PCT/EP2014/074115 filed on Nov. 10, 2014 in the name of Saint-Gobain Glass France, dated Jan. 21, 2015 (English translation & German original).

* cited by examiner

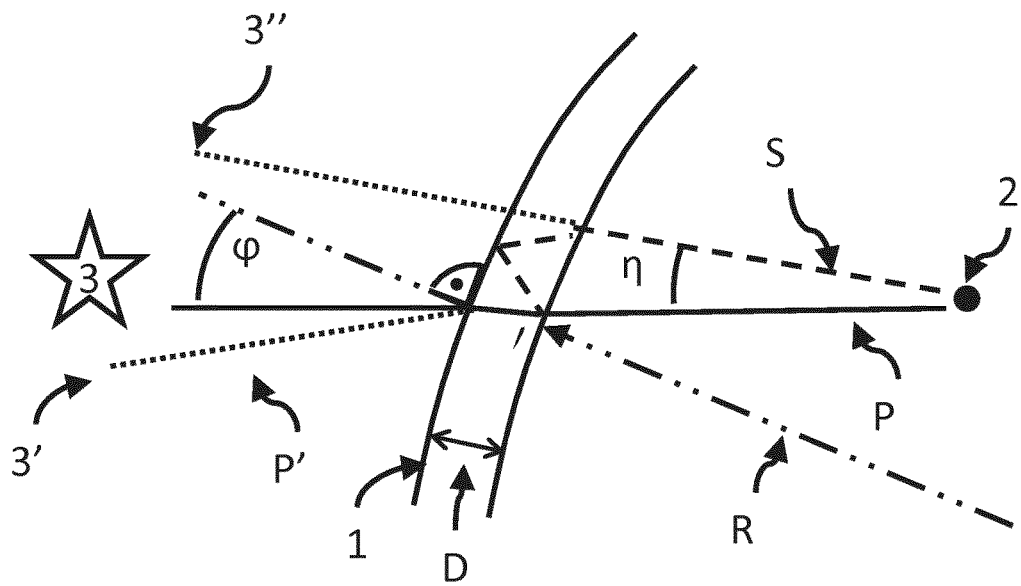
Fig. 1 -- Prior Art --
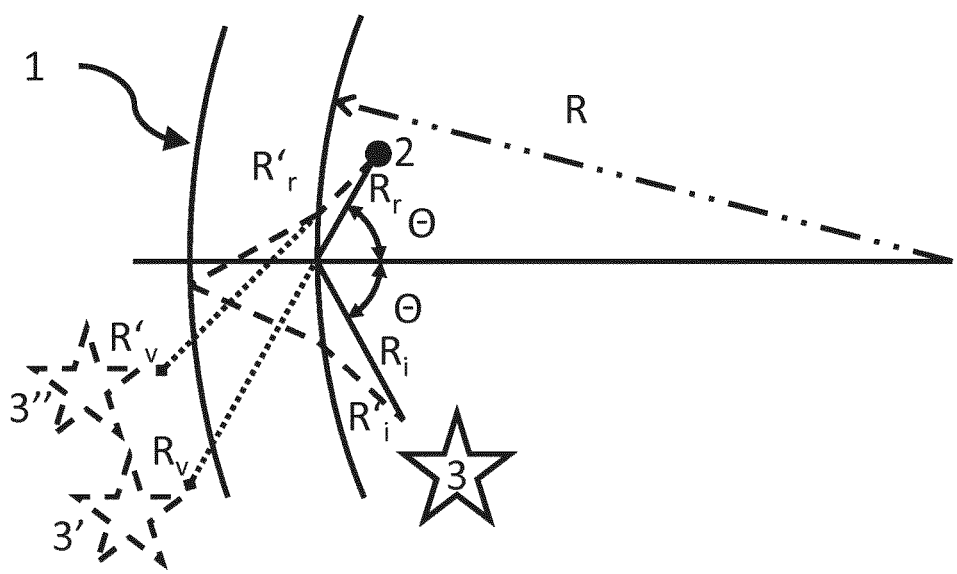
Fig. 2
-- Prior Art --

THERMOPLASTIC FILM FOR A LAMINATED-GLASS PANE HAVING A NON-LINEAR CONTINUOUS WEDGE INSERT IN THE VERTICAL AND HORIZONTAL DIRECTION IN SOME SECTIONS

CROSS REFERENCE TO RELATED APPLICATIONS

The present application is the U.S. national stage entry of International Patent Application No. PCT/EP2014/074115, filed internationally on Nov. 10, 2014, which, in turn, claims priority to European Patent Application No. 13196871.1, filed on Dec. 12, 2013.

The invention relates to a thermoplastic film for a laminated glass pane having a nonlinear continuous wedge insert in the vertical direction in some sections.

BACKGROUND OF THE INVENTION

Laminated glass panes are currently used in many places, in particular in vehicle construction. Here, the term "vehicle" is defined broadly and relates, among other things, to road vehicles, aircraft, ships, agricultural machinery, or even work implements.

Laminated glass panes are also used in other fields. These include, for example, building glazings and also information displays, e.g., in museums or as advertising displays.

In these cases, a laminated glass pane generally has two glass surfaces that are laminated onto an intermediate layer. The glass surfaces themselves can have a curvature and are usually of constant thickness. The intermediate layer usually has a thermoplastic material, usually polyvinyl butyral (PVB), of a predetermined thickness, e.g., 0.76 mm.

Since the laminated glass pane is generally inclined relative to an observer, double images occur. These double images are caused by the fact that incident light usually does not pass completely through both glass surfaces, but instead that at least part of the light is first reflected and only thereafter passes through the second glass surface.

These double images are perceptible in particular in the dark, in particular with strong irradiating light sources, such as the headlights of an oncoming vehicle. These double images are extremely bothersome.

Frequently, the laminated glass pane is also used as a head-up display (HUD) for displaying data. Here, an image is projected on the laminated glass pane using a projection device to display information to the observer in the field of view. In the vehicle sector, the projection device is, for example, arranged on the dashboard such that the projected image is reflected in the direction of the observer on the nearest glass surface of the laminated glass pane inclined relative to the observer.

Again, however, part of the light enters the laminated glass pane and is now, for example, reflected on the inner boundary layer of the glass surface located farther out from the perspective of the observer and the intermediate layer and then exits the laminated glass pane with an offset.

Here, also, a similar effect, the ghost image effect, occurs relative to the image to be displayed.

It must be noted that conventional compensation of the ghost image for one eye position always results in stronger ghost images for different eye positions. Also, a pure conventional compensation of ghost images results, under certain circumstances, in the fact that overcompensation for double images in transmission is observed.

This results in the fact that the respective observer is confused or, in the worst-case, receives incorrect information.

Previously, the attempt has been made to solve this problem by no longer arranging the surfaces of the glass surfaces parallel to each other but, instead, at a fixed angle. This is achieved, for example, in that the intermediate layer has a linearly increasing and/or decreasing thickness. In motor vehicle construction, the thickness is typically varied such that the smallest thickness is provided at the lower end of the pane toward the engine compartment, whereas the thickness increases linearly toward the roof. In other words, the intermediate layer has a wedge shape.

It has, however, been demonstrated that the prior art wedge-angle progressions can only inadequately minimize ghost images of head-up displays.

Based on this situation, one of the objects of the invention is to provide an improvement relative to double images and also ghost images.

BRIEF DESCRIPTION OF THE INVENTION

The object is accomplished by a thermoplastic film for a laminated glass pane with a nonlinear continuous wedge insert in the vertical and horizontal direction in some sections, wherein the laminated glass pane is farther from the observer in the vertical direction at a lower end from the perspective of an observer than at an upper end, wherein, in a laminated glass pane equipped therewith, the thermoplastic film is situated between two glass layers. The term "wedge insert" refers to an insert, in particular a thermoplastic film, with a non-constant thickness. This is the term of art customary in the specific field. The wedge angle is the angle measured at a point between the surfaces of the insert. The wedge insert is nonlinear-continuously relative to the thickness. The wedge insert, that is to say the thermoplastic film, has a nonlinear continuous progression/change in thickness. A linear continuous change would correspond to a prior art constant wedge angle. A nonlinear continuous change results from a non-constant wedge-angle profile, wherein the wedge angle is position dependent. In that case, the wedge-angle profile can be linear or nonlinear. The term "in sections" means that the described progression applies to at least one section of the insert. In particular, the insert can have a plurality of sections which differ over the progression of the wedge-angle profile.

The thermoplastic film has at least a first section with a continuous nonlinear wedge-angle profile in the vertical and horizontal direction such that ghost images from a head-up display are minimized in the region of the first section, wherein the thermoplastic film in the first section and also in other sections also further minimizes double images in transmission. The wedge-angle progression in the vertical direction prevents or reduces vertically offset double or ghost images. Vertical wedge-angle progressions, whether linear or nonlinear, are known from the prior art. Advantageously, by means of the additional wedge-angle progression in the horizontal direction, horizontally offset double or ghost images can also be prevented or reduced. These occur in particular with panes that are highly curved horizontally (so-called "panorama panes").

In one improvement of the invention, the thermoplastic film contains at least one material selected from the group comprising polybutylene terephthalate (PBT), polycarbonate (PC), polyethylene terephthalate (PET) and polyethylene naphthalate (PEN), polyvinyl chloride (PVC), polyvinyl fluorides (PVF), polyvinyl butyral (PVB), ethylene vinyl acetate (EVA), polyacrylate (PA), polymethyl methacrylate (PMMA), polyurethane (PUR), and/or mixtures and copolymers thereof.

In yet another form of the invention, the thermoplastic film has, at the lower edge, a thickness of less than 1 mm, in particular less than 0.9 mm, and preferably a thickness of more than 0.3 mm, in particular more than 0.6 mm.

According to yet another improvement of the invention, the thermoplastic film has, in a region outside the first section, a wedge-angle profile in the vertical direction, that has, for prevention of double images in transmission, a wedge angle that is constant or is variable at least in sections.

In another embodiment of the thermoplastic film, the wedge angle in the vertical direction in the center of the first section of the thermoplastic film is greater in some sections than the wedge angle in the vertical direction at a different horizontal position within the first section. According to yet another embodiment of the invention, the wedge angle in the vertical direction in the center of the thermoplastic film varies inside the first section between 0.8 mrad and 0.2 mrad, preferably between 0.75 mrad and 0.15 mrad, whereas the wedge angle in the vertical direction in the center of the thermoplastic film varies somewhere between 0.6 mrad and 0.1 mrad, preferably between 0.4 mrad and 0.2 mrad, wherein the wedge angle from a lower end to an upper end is a function of the distance from the lower end or from the upper end, wherein the function is at least a second degree function.

In one embodiment of the invention, the thermoplastic film has a noise-reducing effect. By this means, the transmission of noises through a laminated pane provided with the film can advantageously be reduced, as a result of which disturbance due to environmental noises and driving noises can be reduced. Such an effect can be obtained by means of a multilayer, for example, three-layer, thermoplastic film, wherein the inner layer has greater plasticity or elasticity than the outer layers surrounding it, for example, as a result of a higher content of softening agents. In one embodiment of the invention, the thermoplastic film can have at least one tinted zone. Such a tinted zone on the upper edge of the pane is known to the person skilled in the art as a "shaded band"—by this means, disturbance of the driver by blinding sunlight can be reduced.

The thermoplastic intermediate layer can have, in one embodiment of the invention, a sun or heat protection function. For example, the thermoplastic intermediate layer can contain a reflective coating in the infrared range or IR-absorbing additives. The coating or additives can be arranged on or in the thermoplastic film with a wedge angle according to the invention. Alternatively, an additional thermoplastic film, for example, a coated PET film can be introduced into the thermoplastic intermediate layer.

In one embodiment of the laminated pane according to the invention, the first or the second glass pane can have a functional coating, preferably on its surface facing the thermoplastic film. Such functional coatings are familiar to the person skilled in the art, for example, electrically conductive coatings, heatable coatings, IR-reflective coatings, low emissivity coatings, antireflective coating, coloring coatings.

In one embodiment, the laminated pane according to the invention has a heating function. The heating function can affect the entire pane surface or only parts thereof. Such heating functions can, for example, be realized by means of wires embedded in the thermoplastic intermediate layer or by means of an electrically conductive coating on one of the glass panes or on a film of the intermediate layer.

The invention further proposes a laminated glass pane with a thermoplastic film according to the invention as well as corresponding production methods for the thermoplastic film or the laminated glass pane as well as a head-up display arrangement and the use of a thermoplastic film and laminated glass panes equipped therewith.

The thermoplastic film according to the invention with variable thickness can be a film with noise-reducing effect (a so-called "acoustic film"). Such films are typically composed of at least three layers, wherein the middle layer has higher plasticity or elasticity than the outer layers surrounding it, for example, as a result of a higher softening agent content.

The laminated glass pane can contain, in addition to the thermoplastic film according to the invention, a tinted insert. Such inserts are typically arranged in the upper region of the laminated glass pane/windshield and are intended to reduce the disturbing or blinding of the driver by sunlight. They are commonly referred to as a "shaded band".

The laminated glass pane can have a functional coating, for example, an IR reflecting or absorbing coating, a UV reflecting or absorbing coating, a low emissivity coating, a heatable coating. The functional coating is preferably applied on one of the surfaces facing the wedge insert, where it is protected against corrosion and damage.

The laminated glass pane can also contain an insert film with a functional coating between the glass panes, for example, made of polyethylene terephthalate (PET). Such coated PET films, for example, with IR reflecting coatings are commercially available and can thus be easily introduced into laminated glass.

BRIEF DESCRIPTION OF THE DRAWINGS

Embodiments of the present invention are described by way of example with reference to the appended drawings, which depict:

FIG. 1 the basic context of the development of double images in transmission,

FIG. 2 the basic context of the development of ghost images in reflection,

DETAILED DESCRIPTION OF THE INVENTION WITH REFERENCE TO THE DRAWINGS

FIG. 1 depicts the basic context of the development of double images in transmission using a beam image. A curved pane 1 is assumed. The curved pane has, at the point of entry of the beam into the curved glass pane 1, a radius of curvature (R+D). Light is now emitted from the light source 3. This light strikes the pane and is refracted in accordance with known refraction laws at the transition from air to glass on the first boundary and from glass to air on the second boundary and reaches the eye 2 of an observer. This beam is depicted as the solid line P. From the perspective of the observer, the light source 3 appears to be situated at the location 3'. This is depicted as beam P'. However, in addition to this beam P referenced as the primary beam, the beam is only partially refracted on the second gas/air boundary in the manner described above; a smaller fraction is reflected on the second boundary and is once again reflected on the first boundary before the beam now passes through the second boundary and reaches the eye 2 of the observer. This beam, the so-called "secondary beam" is depicted as a dashed line S. From the perspective of the observer, the light source 3 also appears to be situated at the location 3". The angle η enclosed by the primary beam P' and the secondary beam S is the so-called "double image angle".

In order to address this double image, provision can now be made that a wedge angle be provided between the two boundary layers assumed to be substantially parallel in FIG. 1. According to J. P. Aclocque "Doppelbilder als storender optischer Fehler der Windschutzscheibe [Double Images As Interfering Optical Errors in Windshields]" in Z. Glastechn. Ber. 193 (1970) pp. 193-198, the double image angle can be calculated as a function of the radius of curvature of the glass pane and the angle of incidence of the light beam according to the following equation:

$$\eta = \frac{2d}{R} \cdot \frac{\sin\varphi}{\sqrt{n^2 - \sin^2\varphi}},$$

where
η is the double image angle, n is the index of refraction of the glass, d is the thickness of the glass pane, R is the radius of curvature of the glass pane at the location of the incident light beam, and φ is the angle of incidence of the light beam relative to the perpendicular on the tangent to the pane.

In the case of flat glass panes, the double image angle η is, according to the following formula $$\eta = 2 \cdot \delta \cdot \frac{\sqrt{n^2 - \sin^2\varphi}}{\cos\varphi}$$

a function of the wedge angle δ formed by the glass surfaces.

Thus, by setting the aforementioned formulas equal, the wedge angle necessary for the elimination of the double image can be calculated:

$$\delta = \frac{d}{R} \cdot \frac{\cos\varphi \cdot \sin\varphi}{n^2 - \sin^2\varphi}.$$

Figure 3:
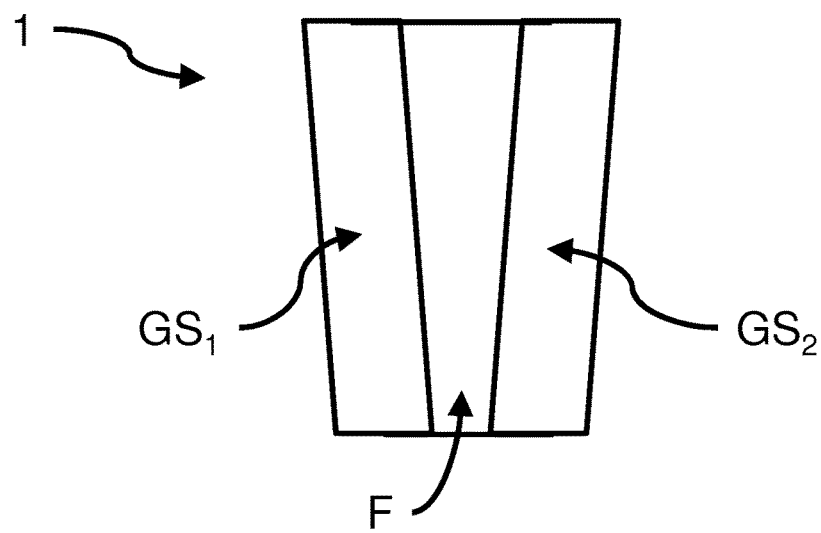
FIG. 3 an exemplary structure of a laminated glass pane with a wedge-shaped interlayer, FIG. 4 an exemplary wedge-angle profile for compensation of double images in transmission, FIG. 5 an exemplary arrangement that demonstrates the relationship of different eye positions relative to a head-up display.

Generally, this wedge angle is realized in that in laminated glass panes 1 a wedge-shaped intermediate layer F is placed between a first glass layer $GS_1$ and a second glass layer $GS_2$, see FIG. 3. It can generally be assumed for the sake of simplicity that the index of refraction n is constant, since the difference in the index of refraction of the intermediate layer F and the glass panes $GS_1$, $GS_2$ is rather small such that there is hardly any effect due to the small difference.

This idea can be also applied with curved windshields. Generally, for the sake of simplicity the angle of incidence and the radius of curvature are assumed for a reference eye point, and the wedge angle determined therewith is used for the entire windshield.

In the case of large laminated glass panes 1, so-called "panorama panes", and/or more highly curved laminated glass panes 1, this approach is, however, no longer adequate such that here, generally, a wedge-angle progression variable in the vertical direction must be determined.

Then, it is possible, for example, by pointwise calculation along an imaginary vertical center line of a laminated glass pane and possible interpolation, to determine a compensation wedge-angle profile δ.

For the calculation of the double image angle q and the corresponding local compensation wedge angle δ, the arrangement as recommended in the Test Specification ECE R43 Annex 3 for determining the double image angle can be selected. With this arrangement, the double image angles are determined when the head of the driver moves from a lower position in the vertical direction to an upper end position. In other words, the driver's line of sight always remains horizontal. However, alternatively or additionally, an arrangement can be selected in which the double image angle is calculated from a mean unchanging position of the driver (eye point), where the angle of sight of the driver through the windshield changes. The result of different determination variants can be transformed, even with weighting, into an overall result.

Figure 4:
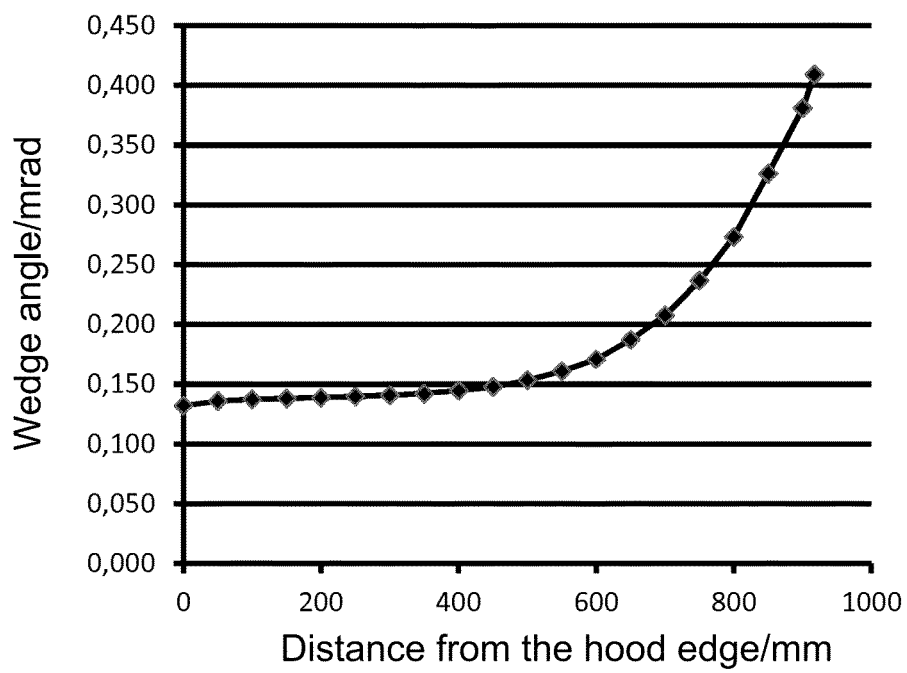

An exemplary wedge-angle profile, i.e., a progression of the wedge angle as a function of the distance from the hood edge, i.e., to the lower end of a laminated glass pane 1, is shown in FIG. 4. It is clearly discernible that a wedge angle δ for an imaginary virtual center line optimized according to the above formulas begins, in the exemplary windshield, at the lower end initially with values of less than 0.15 mrad and with increasing distance from the hood edge, i.e., toward the upper end of the laminated glass pane 1, increases to values of more than 0.4 mrad.

Figure 8:
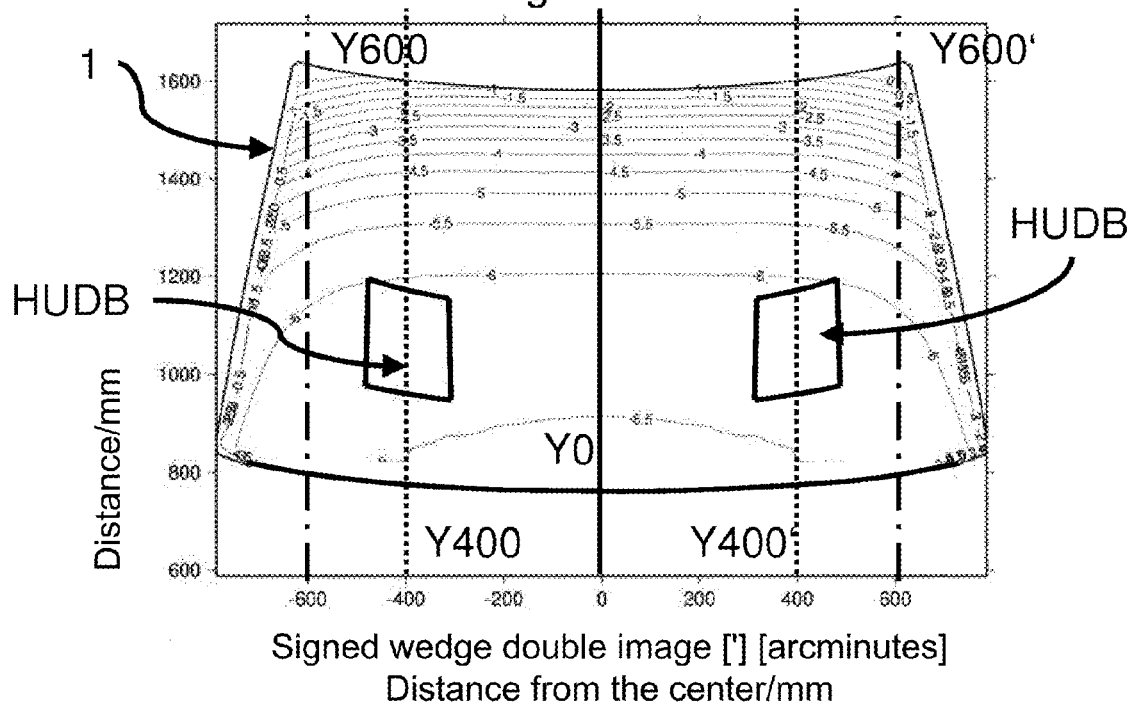

In an exemplary method, the wedge angle required for compensation of the double image is calculated mathematically as a function of the local angle of incidence and a local radius of curvature of the laminated glass pane 1, and the resultant progression of the double image angle η is determined. By way of example, a possible result of double image angles η is shown in FIG. 8 for a laminated glass pane 1 of a motor vehicle. Here, an exemplary laminated glass pane 1 is mapped onto an xy coordinate system, wherein the horizontal axis indicates a distance relative to the center of the laminated glass pane 1 and the vertical axis indicates a distance relative to a lower plane (not shown). It should be noted that the representation of the pane does not necessarily correspond to its actual installation, but is depicted in the figure such that the greatest possible projection surface is present. The resultant double image angle is reported in arcminutes.

With regard to head-up displays, a problem develops which is similar to the phenomenon of double images and is referred to as a ghost image.

FIG. 2 presents the basic context of the development of ghost images in reflection with reference to a beam image. Here, a curved glass pane 1 is assumed. The curved glass pane 1 has a radius of curvature R at the location of the entry of a beam into the curved glass pane 1. Light is now emitted from the light source 3, which is representative of a head-up display HUD. This light impinges on the glass pane 1 along the beam $R_i$ from the inside at an angle $\Theta$ and is reflected there at the same angle $\Theta$. The reflected beam $R_r$ reaches the eye 2 of an observer. This beam path is depicted as a solid line. From the perspective of the observer, the light source 3 appears to be situated virtually at the location 3, i.e., in front of the glass pane 1. This is depicted as beam $R_v$. In addition to this first beam, another beam reaches the eye 2 of the observer. This beam $R'_i$ likewise originates from the light source 3. However, this beam $R'_i$ penetrates, in accordance to the known laws of refraction, into the glass pane 1 on the inner air/glass boundary surface and is reflected on the outer glass/air boundary surface before the beam passes through the inner boundary surface and reaches the eye 2 of the observer as beam $R'_r$. The term "inner boundary surface" thus refers to the boundary surface that is situated closer to the observer, whereas the term "outer boundary surface" refers to the boundary surface that is farther away from the observer. This beam path is depicted as a dashed line. From the perspective of the observer, the light source 3 appears to be situated virtually at the location 3″, i.e., likewise in front of the glass pane 1. This is depicted as beam $R'_v$.

To address this problem, the wedge angle can now be altered such that the beam $R'_r$ reflected on the outer boundary surface and the beam $R_r$ reflected on the inner boundary surface overlap relative to the eye 2 of the observer, i.e., the beam reflected on the outer boundary surface exits at the point of reflection of the beam impinging on the inner boundary surface.

Figure 5:
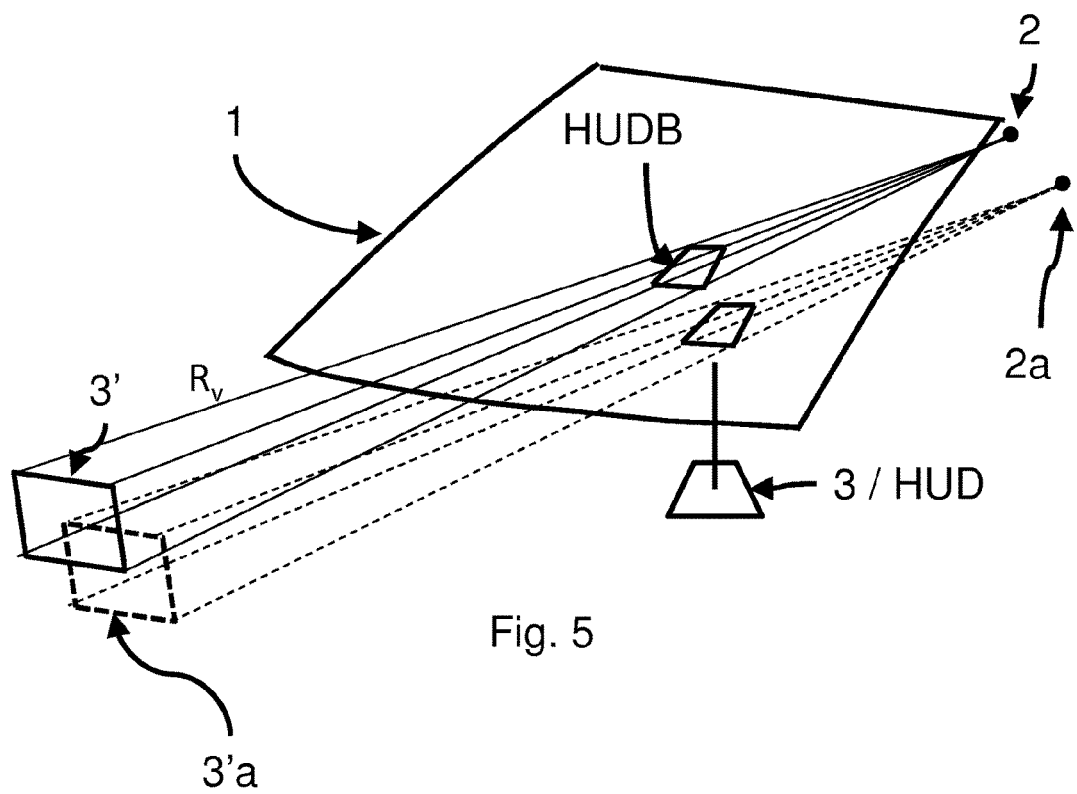

However, if this is done only for a single eye position, as is customary according to the prior art, the wedge angle determined therefrom can yield non-optimum results. This can be explained, among other things, by the fact that both the body sizes of drivers for whom the head-up displays are primarily intended and the seating position are very different such that there are a large number of possible eye positions. This is illustrated in FIG. 5. There, two possible eye positions 2 and 2*a* are depicted on the right side of FIG. 5. The position of the image 3' or 3'*a* results as a function of the eye position 2 or 2*a*. Even the region of the pane in the head-up display region HUDB ("active region") involved in the optical process for image generation is a function of the eye position 2, 2*a*. As a model, the projector image 3 and virtual image 3', 3'*a* can be construed as full area rectangles. The connecting lines from the eye position 2, 2*a* to the corners of the rectangles are drawn in in the figure. The intersections of these connecting lines with the pane yield the corners of a trapezoid which, by way of a model, should describe the "active region" of the pane. These trapezoids are depicted, by way of example, inside the head-up display region HUDB on the glass pane 1 in the figure. Thus, the virtual display is situated in different places depending on the eye position and, accordingly, there is, for each of these eye positions, possibly a different value for an optimized wedge angle. In addition, it should be mentioned here that a wedge angle optimized exclusively for ghost images usually results in overcompensation of double images such that the double images thus caused are again problematic relative to the perception of the observer and/or compliance with regulatory test specifications and/or compliance with customer specifications relative to double images.

Figure 6:
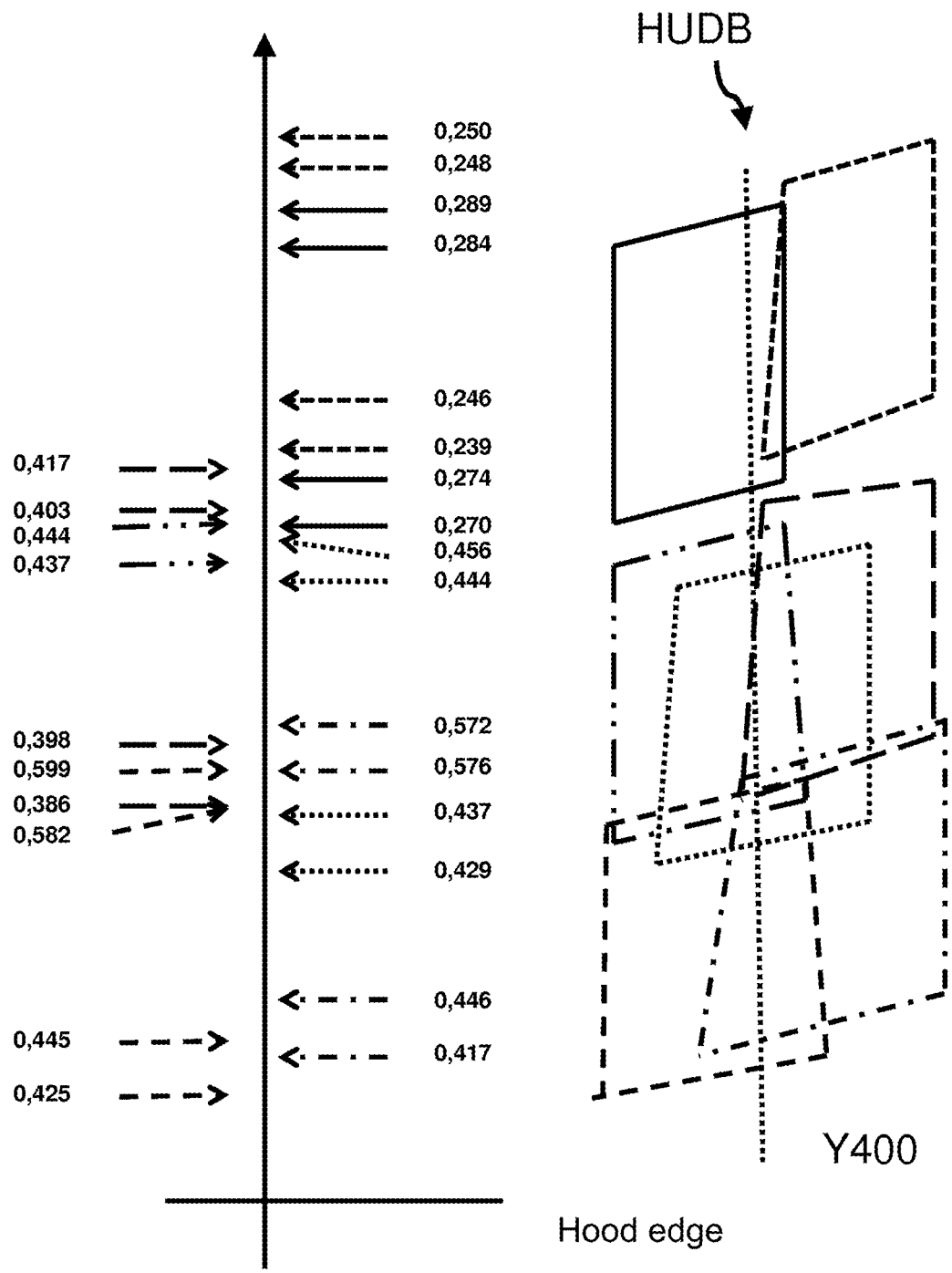
FIG. 6 wedge-angle values determined as examples for different vertices of an HUD region that correspond to different eye positions, FIG. 7 an exemplary wedge-angle profile for compensation of ghost images in reflection, FIG. 8 an exemplary distribution of double image angles on a laminated glass pane, FIG. 9 an exemplary distribution of the distance between the ghost image and the desired HUD image on a HUD region of a laminated glass pane, and FIG. 10 a combined view of an exemplary wedge-angle profile in a cross-section through the HUD field for compensation of double images in transmission in individual sections and for compensation of ghost images in reflection in another section.

FIG. 6 reports the resultant positions of an HUD in the form of the above-described trapezoid (as "active" regions) within a head-up display region HUDB for different positions of the eye 2 relative to the laminated glass pane 1. For better differentiation, the trapezoids are presented with different types of lines. For clarity, the associated wedge angles determined for a number of trapezoids are indicated relative to the corners of the trapezoids and entered on the left side relative to the distance from the hood edge.

By way of example, vertical section lines Y400, Y400'*bzw*. Y600, Y600', and Y0 are drawn in in FIG. 8.

Figure 7:
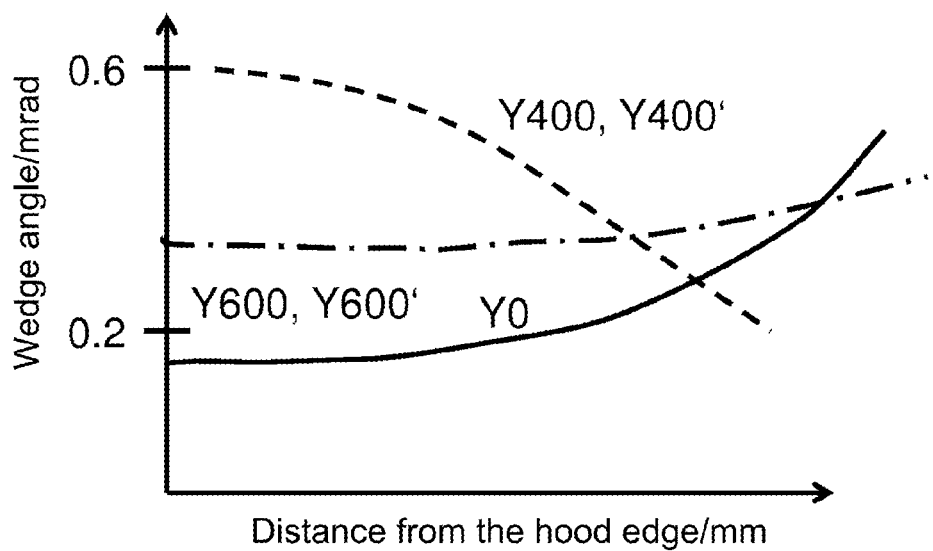

FIG. 7 shows possible optimum progressions of the wedge-angle profile for these vertical section lines Y400, Y400'*bzw*. Y600, Y600', and Y0 relative to the distance from the head-up display region. It is readily discernible for each of the profiles in FIG. 7 that it is in each case continuous and nonlinear. It can also be readily deduced that the horizontal wedge-angle profile for a specific distance from the lower edge varies smoothly from Y400 to the value at Y0. The vertical wedge-angle profile of the sections Y0, Y600, and Y600' is optimized such that the double image in transmission is reduced. This is advantageous for sections outside the HUD region HUDB, since there no contribution has to be made for compensation of ghost images in reflexion. The sections depicted are provided as examples and are, in particular, dependent on the vehicle model. It can also be readily deduced that the horizontal wedge-angle profile for a specific distance from the lower edge varies smoothly from Y400 to the value at Y600. Also from FIG. 6, corresponding wedge-angle profiles could be readily determined for individual section lines.

Figure 9:
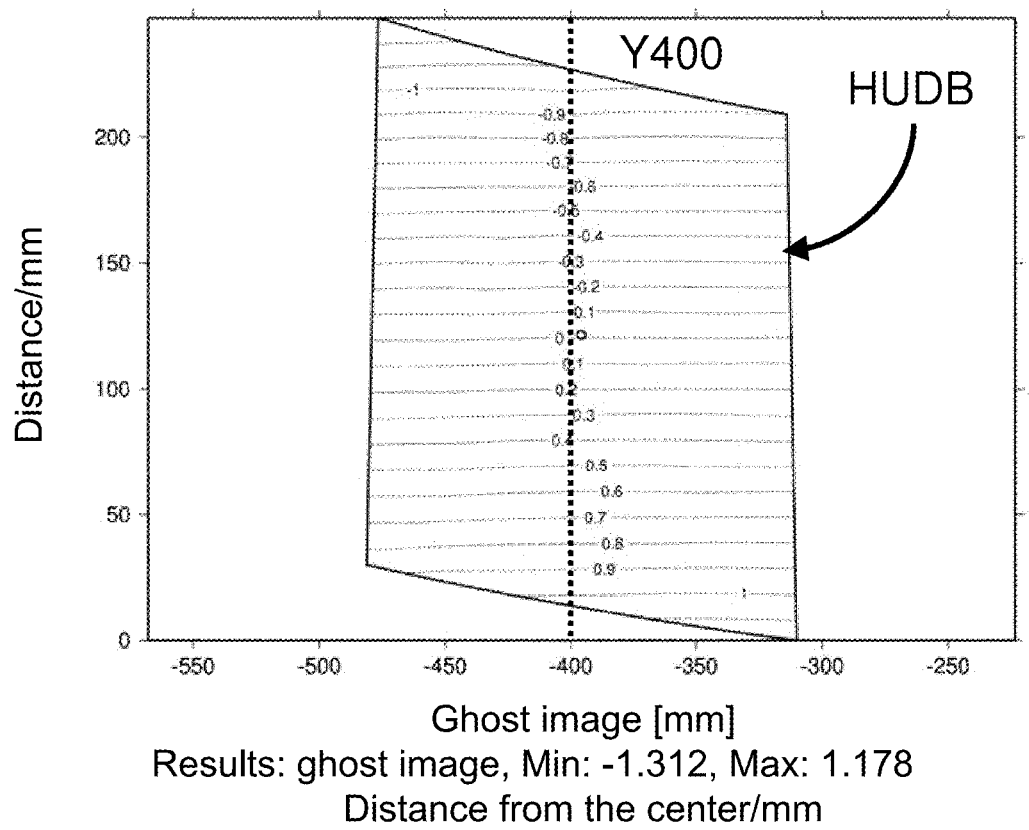

In an exemplary method, the wedge angle required for compensation of the double image is calculated as a function of the local angle of incidence and a local radius of curvature of the laminated glass pane 1, and the resultant progression of the wedge angle is determined. By way of example, a possible result of perceived location-shifted ghost images is depicted in FIG. 9 for a head-up display region HUDB of a laminated glass pane 1 of a motor vehicle. This head-up display region HUDB corresponds to the left detail HUDB (and, in a mirror image, also to the right detail HUDB) in FIG. 8. The advantage of such a mirror-image symmetrical design resides in the fact that the same pane is equally suitable for vehicles in countries with driving on the right and for vehicles in countries with driving on the left. However, in principle, the pane can also be designed asymmetrically, with the HUDB arranged preferably only in the half of the pane that is in front of the driver position in the installed position. In this respect, the horizontal axis again refers to a distance relative to the center of the laminated glass pane 1. Here, however, the vertical axis relates to the deepest point of the head-up display region HUDB. The figure now shows the distance between a primary image and a secondary image in mm.

By means of such a thermoplastic film F, it is readily possible to minimize both double images in transmission and also ghost images and reflection depending on requirements at any desired location. Thus, even large head-up display regions HUDB can be realized.

Figure 10:
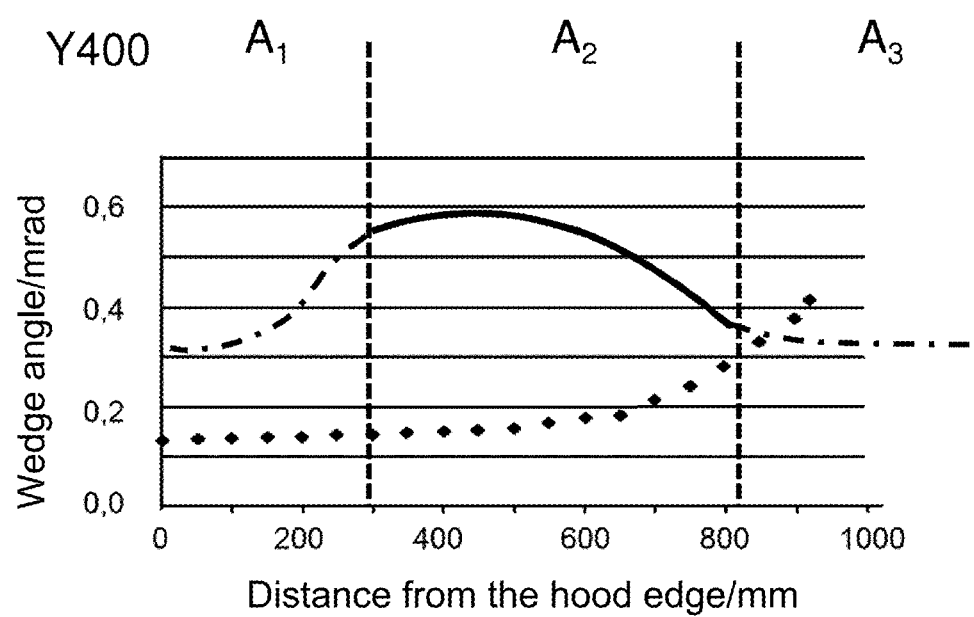

Without loss of generality, provision can also be made that the thermoplastic film F not only makes available, within the first section A2, optimization with regard to ghost images and possibly also with regard to double images, but provision can, for example, also be made that, in the region outside the first section A2, the thermoplastic film F has a wedge-angle profile in the vertical direction that has a constant wedge angle or a wedge angle variable at least in some sections to prevent double images in transmission. An exemplary wedge-angle profile Y400 or Y400' is depicted in FIG. 10. There, in the lower half, an optimized wedge-angle progression for optimization of double images in transmission determined according to the above formula relationship for an exemplary laminated glass pane 1 is depicted using diamonds for specific distances from the hood edge. Also, in the section $A_2$, the progression optimized for ghost images is shown as a solid line.

The two curves can now be brought closer together, with a large open space being present here for the optimization. Thus it is possible to use, for example, as indicated in FIG. 10 in the "outer regions" $A_1$ and $A_3$ with regard to the first section $A_2$ as a transition region, with, for example, a slight overcompensation of double images occurring in the region of the section $A_1$, and also with a slight undercompensation occurring in the region of the section $A_3$. A possible wedge-angle profile can be provided in the dash-dot lines in the sections $A_1$ and $A_3$, which enable a seamless transition into the first section $A_2$. Here, different factors can be taken into account; thus, it can, for example, be desirable to minimize double images more than ghost images in the first section $A_2$, then it would be possible, for example, to shift the curve depicted as a solid line in section $A_2$ closer to the diamond curve or else to align the two curves with each other using suitable approximation solutions. In this process, other parameters, such as a maximum wedge angle or a maximum wedge-angle change, can also be taken into account. Such parameters can, for example, result from the fact that a change in the thickness of the laminated glass pane 1 must not exceed a maximum value. The wedge-angle profile in the other sections can easily also be purely linear and, for example, have a fixed wedge angle in the vertical direction.

Preferably, with regard to the first section $A_2$ as depicted in FIG. 7, the wedge-angle profile can be designed such that the wedge angle in the vertical direction in the center of the first section $A_2$ of the thermoplastic film, i.e., for example, at Y400, is larger than the wedge angle in the vertical direction at a different horizontal position, i.e., for example, Y390 or Y410, inside the first section $A_2$. Generally, this also applies to all other regions outside of section $A_2$, i.e., outside the head-up display region HUDB of the laminated glass pane 1.

In embodiments of the invention, provision can also be made that, as depicted in FIG. 7, the wedge angle Y400 in the vertical direction in the center of the thermoplastic film F inside the first section varies between 0.75 mrad and 0.15 mrad, whereas the wedge angle Y0 in the vertical direction in the center of the thermoplastic film F varies somewhere between 0.6 mrad and 0.1 mrad. In this case, the wedge angle from a lower end to an upper end can be understood as a function of the distance from the lower end or from the upper end, wherein the function is, for example, at least a second degree function.

In the invention, the wedge-angle profile can be particularly easily determined due to the fact that vertical wedge angles required for compensation of ghost images in the first section $A_2$ can be calculated as a function of the local angle of incidence and a local radius of curvature of the laminated glass pane 1 for various eye positions. The resultant progression of the vertical wedge angle is determined, for example, for a specific number of vertical sections, e.g., at the edge and in the center. In addition, the horizontal wedge angle required for the compensation of ghost images in the first section is calculated as a function of the local angle of incidence and a local radius of curvature of the laminated glass pane 1, if this has not already occurred, and the resultant progression of the horizontal wedge angle is determined. Furthermore, the wedge angle required for compensation of the double image is now calculated as a function of the local angle of incidence and a local radius of curvature of the laminated glass pane 1, and the resultant progression of the wedge angle is determined. For reasons of simplification, it can, in particular, in the latter step, be possible to determine these values only for a single vertical profile, for example, Y0, since, frequently, the values for other vertical profiles, e.g., profile Y400, differ only insignificantly from this. Thus, the calculational effort can be kept manageable.

Such a thermoplastic film F can contain at least one material selected from the group comprising polybutylene terephthalate (PBT), polycarbonate (PC), polyethylene terephthalate (PET) and polyethylene naphthalate (PEN), polyvinyl chloride (PVC), polyvinyl fluorides (PVF), polyvinyl butyral (PVB), ethylene vinyl acetate (EVA), polyacrylate (PA), polymethyl methacrylate (PMMA), polyurethane (PUR), and/or mixtures and copolymers thereof. The selection of a suitable material for the thermoplastic film F can, for example, depend on the properties of the film with regard to the refractive index and also the strength achievable with regard to a certain film thickness. In principle, the invention is not restricted to a specific material for a thermoplastic film F.

In order to minimize double images, in the laminated glass panes 1 generally installed at an angle in vehicle construction, a wedge-angle profile is preferred, wherein, in the vertical direction, the wedge angle at the lower edge is smaller than the wedge angle at the upper edge, i.e., the wedge angle in the vicinity of the vehicle hood is smaller than the wedge angle in the vicinity of the roof edge of a typical motor vehicle.

For manufacture, it is particularly advantageous for the thermoplastic film F according to the invention to have, at the lower edge, a thickness of less than 1 mm, preferably less than 0.9 mm, and preferably a thickness of more than 0.3 mm, in particular more than 0.6 mm. As a result, the film can be used in a proven manner in the production of laminated glass panes 1, without the need for cost-driving special equipment.

Thus, a structure of a laminated glass pane 1, as shown in FIG. 3, can be obtained even with the thermoplastic film F according to the invention between a first glass layer $GS_1$ and a second glass layer $GS_2$.

Such laminated glass panes 1 have a thickness of 1 mm to 8 mm, preferably 3.5 to 5.3 mm, and can thus readily be further processed like conventional laminated glass panes.

Here, the first glass layer $GS_1$ and/or the second glass layer $GS_2$ of the laminated glass pane 1 typically have a thickness selected from a range of roughly 1 mm to 3 mm, preferably of 1.4 mm to 2.6 mm auf. This guarantees the required properties of splinter protection and/or sound insulation.

With the thermoplastic film F, a laminated glass pane 1 can thus be produced in a proven manner, in that a first glass layer $GS_1$ and a second glass layer $GS_2$ are obtained, wherein the thermoplastic film F is placed on the first glass layer $GS_1$, and the second glass layer GS2 is placed on thermoplastic film with the use of an autoclave process. Thereafter, the thermoplastic film F is bonded to the first glass layer $GS_1$ and the second glass layer $GS_2$ in the autoclave under the action of heat and pressure.

Of course, the thermoplastic film F according to the invention can be used not only in an autoclave process but can, for example, also be used with a vacuum thermal furnace process or similar autoclave-free processes.

It is also, in principle, possible to initially bond only a first glass layer $GS_1$ to the thermoplastic film F after placement and only after that to place the second glass layer $GS_2$ and to bond it to the thermoplastic film F previously bonded to the glass layer $GS_1$.

Thermoplastic films F thus produced can be used in laminated glass panes 1 in motor vehicles, in particular as windshields for display of a head-up display, or in buildings or as data displays.

Use in a head-up display arrangement can be seen, for example, in FIG. 5. There, a projector as a light source illuminates an exemplary head-up display region HUDB of a laminated glass pane 1, which is equipped with a thermoplastic film F according to the invention. Ghost images of the projector are minimized in the head-up display region HUDB, whereas the entire laminated glass pane 1 also reduces double images in transmission (not shown).

As a result, the invention enables improvement with regard to minimization of ghost images of head-up displays for a large number of eye positions without generating substantially more ghost images outside the head-up display region HUDB. Furthermore, by means of the invention, it can also be accomplished that in the head-up display region HUDB as well as in the other regions, double images in transmission can be reduced. In addition, larger head-up display regions HUDB as well as more complex windshield curve designs can be realized with the invention presented.

Although in the figures in general only a head-up display region HUDB is depicted, the invention is not restricted thereto. For example, even more head-up display regions HUDB, e.g., for right-hand and left-hand vehicles or even for different purposes, such as an infotainment system and driver assistance systems can be provided. Provision can also be made that, for example, in the case of head-up display regions HUDB that are used substantially in infotainment, only minimization of ghost images is provided, whereas with driver assistance systems both minimization of ghost images and minimization of double images is sought.

As a result, the invention enables improvement with regard to minimization of ghost images of head-up displays for a large number of eye positions without generating substantially more ghost images outside the head-up display region HUDB. Furthermore, by means of the invention, it can also be accomplished that in the head-up display region HUDB as well as in the other regions, double images in transmission are reduced. In addition, larger head-up display regions HUDB as well as more complex windshield curve designs can be realized with the invention presented.

The invention claimed is:

1. A thermoplastic film for a laminated glass pane with a nonlinear continuous wedge insert in vertical and horizontal direction, the thermoplastic film being adapted to be situated between two glass layers of the laminated pane, the thermoplastic film comprising:
    a first section having a continuous nonlinear change of the film thickness in the vertical and horizontal direction such that ghost images from a head-up display are minimized in a region of the first section,
        wherein a wedge angle in the vertical direction in the center of the first section of the thermoplastic film is greater in some sections than a wedge angle in the vertical direction at a different horizontal position inside the first section, and
        wherein the thermoplastic film also minimizes double images in transmission in the at least first section.
2. The thermoplastic film according to claim 1, wherein the thermoplastic film contains at least one material selected from the group consisting of polybutylene terephthalate (PBT), polycarbonate (PC), polyethylene terephthalate (PET) and polyethylene naphthalate (PEN), polyvinyl chloride (PVC), polyvinyl fluorides (PVF), polyvinyl butyral (PVB), ethylene vinyl acetate (EVA), polyacrylate (PA), polymethyl methacrylate (PMMA), polyurethane (PUR), and/or mixtures and copolymers thereof.
3. The thermoplastic film according to claim 1, wherein the wedge angle at a lower edge is smaller than the wedge angle at an upper edge of the laminated glass pane.
4. The thermoplastic film according to claim 1, wherein the thermoplastic film has, at a lower edge, a thickness of less than 1 mm.
5. The thermoplastic film according to claim 1, wherein in a region outside the first section the thermoplastic film has, in the vertical direction, a wedge-angle profile that has, for prevention of double images in transmission, a wedge angle that is constant or variable at least in some sections.
6. The thermoplastic film according to claim 1, wherein
    the wedge angle in the vertical direction in the center of the thermoplastic film inside the first section varies between 0.8 mrad and 0.1 mrad,
    the wedge angle in the vertical direction in the center of the thermoplastic film varies between 0.6 mrad and 0.1 mrad, and
    the wedge angle from a lower end to an upper end is a function of the distance from the lower end or from the upper end, the function being at least a second degree function.
7. A laminated glass pane, comprising:
    a first glass layer and a second glass layer, and
    the thermoplastic film according to claim 1, located between the first glass layer and the second glass layer.
8. The laminated glass pane according to claim 7, wherein the laminated glass pane has a thickness of 1 mm to 8 mm at a lower end.
9. The laminated glass pane according to claim 7, wherein the first glass layer and/or the second glass layer have a thickness selected from a range of about 1 mm to 3 mm at a lower end.
10. A method for producing the laminated glass pane according to claim 7, comprising:
    obtaining the first glass layer and the second glass layer,
    placing the thermoplastic film on the first glass layer,
    placing the second glass layer on the thermoplastic film,
    bonding the first glass layer to the thermoplastic film, and
    bonding the second glass layer to the thermoplastic film.
11. The method according to claim 10, wherein the wedge angle is calculated as a function of the local angle of incidence and a local radius of curvature of the laminated glass pane, and the resultant progression of the wedge angle is determined.
12. A head-up display arrangement, comprising:
    a projector for illuminating a head-up display region of a laminated glass pane, and
    a laminated glass pane comprising the thermoplastic film according to claim 10, wherein, during operation, the projector substantially illuminates a second section.
13. An arrangement comprising the laminated glass pane according to claim 7, said arrangement being a motor vehicle, in particular a windshield for displaying a head-up display, a building or an information display.
14. A method for producing the thermoplastic film according to claim 1, comprising:
    calculating the vertical wedge angle required for compensation of ghost images in the first section as a function of the local angle of incidence and a local radius of curvature of the laminated glass pane,
    determining the resultant progression of the vertical wedge angle,
    calculating the horizontal wedge angle required for compensation of ghost images in the first section as a function of the local angle of incidence and a local radius of curvature of the laminated glass pane, determining the resultant progression of the horizontal wedge angle, calculating the wedge angle required for compensation of the double image as a function of the local angle of incidence and a local radius of curvature of the laminated glass pane, and determining the resultant progression of the wedge angle.

15. An arrangement for laminated glass panes comprising the thermoplastic film according to claim 1, said arrangement being a motor vehicle, a building or an information display.

* * * * *